(12) United States Patent
Misaras

(10) Patent No.: US 6,371,548 B1
(45) Date of Patent: Apr. 16, 2002

(54) AUTOMOTIVE TRIM PANEL WITH ELECTRICAL WIRING INCORPORATED THEREIN

(75) Inventor: David Mark Misaras, Rochester Hill, MI (US)

(73) Assignee: Textron Automotive Company Inc., Troy, MI (US)

( * ) Notice: Subject to any disclaimer, the term of this patent is extended or adjusted under 35 U.S.C. 154(b) by 0 days.

(21) Appl. No.: 09/625,117

(22) Filed: Jul. 25, 2000

(51) Int. Cl.[7] .................................................. B60J 5/00
(52) U.S. Cl. ................... 296/146.7; 296/39.1; 296/214; 439/34; 174/72 A
(58) Field of Search ............................ 296/146.7, 39.1, 296/191, 208, 214, 37.8; 439/34; 174/72 A

(56) References Cited

U.S. PATENT DOCUMENTS

| | | | | |
|---|---|---|---|---|
| 4,815,984 A | * | 3/1989 | Sugiyama et al. ... | 296/146.7 X |
| 4,869,670 A | * | 9/1989 | Ueda et al. .......... | 296/146.7 X |
| 4,904,429 A | * | 2/1990 | Takahashi et al. ......... | 264/46.7 |
| 6,126,228 A | * | 10/2000 | Davis, Jr. et al. ........ | 296/146.7 |
| 6,142,556 A | * | 11/2000 | Tanaka et al. ........... | 296/146.7 |

* cited by examiner

*Primary Examiner*—Joseph D. Pape
(74) *Attorney, Agent, or Firm*—Hayes, Soloway, Hennessey, Grossman & Hage PC

(57) ABSTRACT

A vehicle interior trim panel and method of making is provided where the vehicle interior trim panel comprises a skin, a substrate, a foam located between the skin and the substrate, and a flat wire at least partially surrounded by and embedded in the foam.

33 Claims, 3 Drawing Sheets

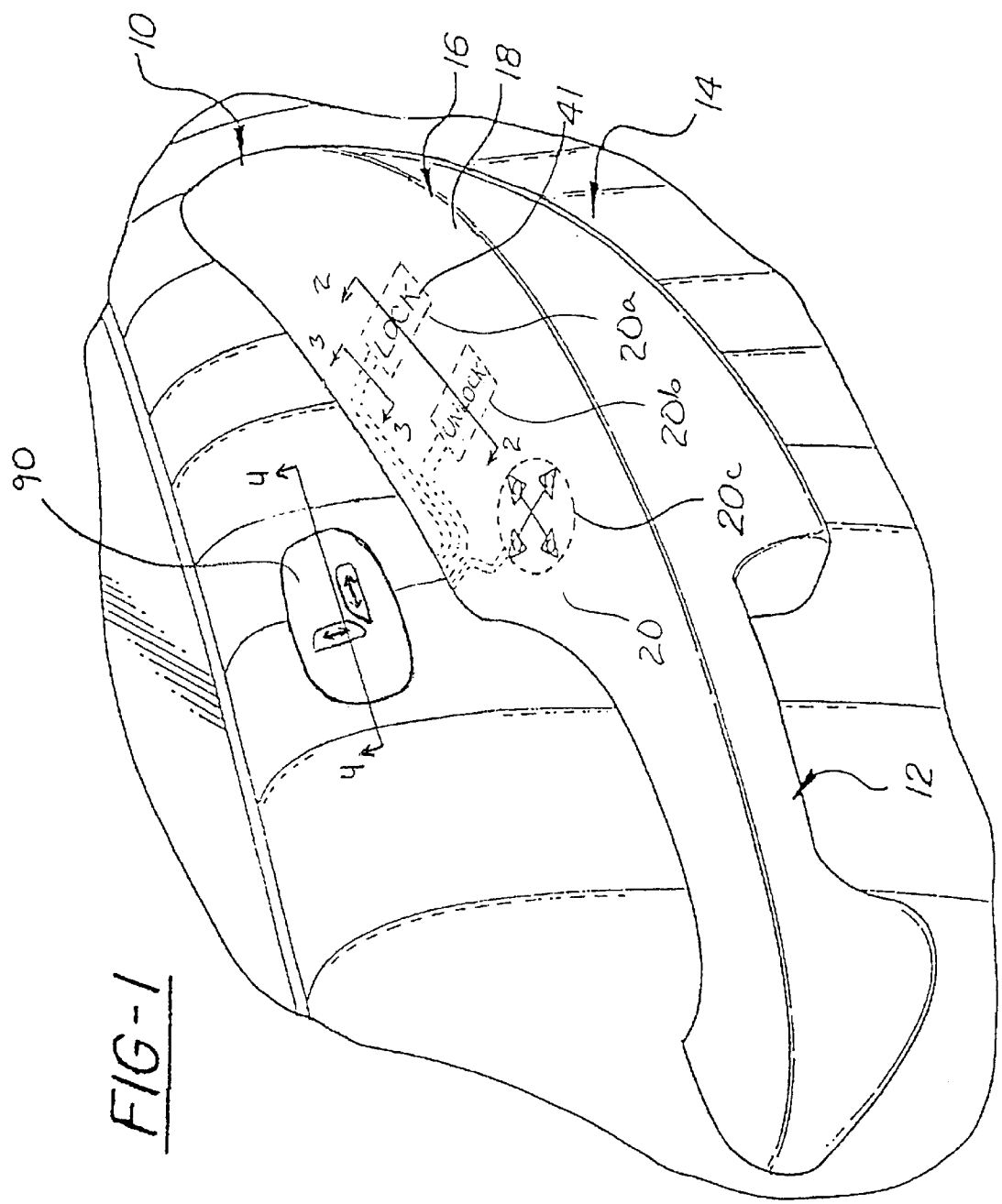

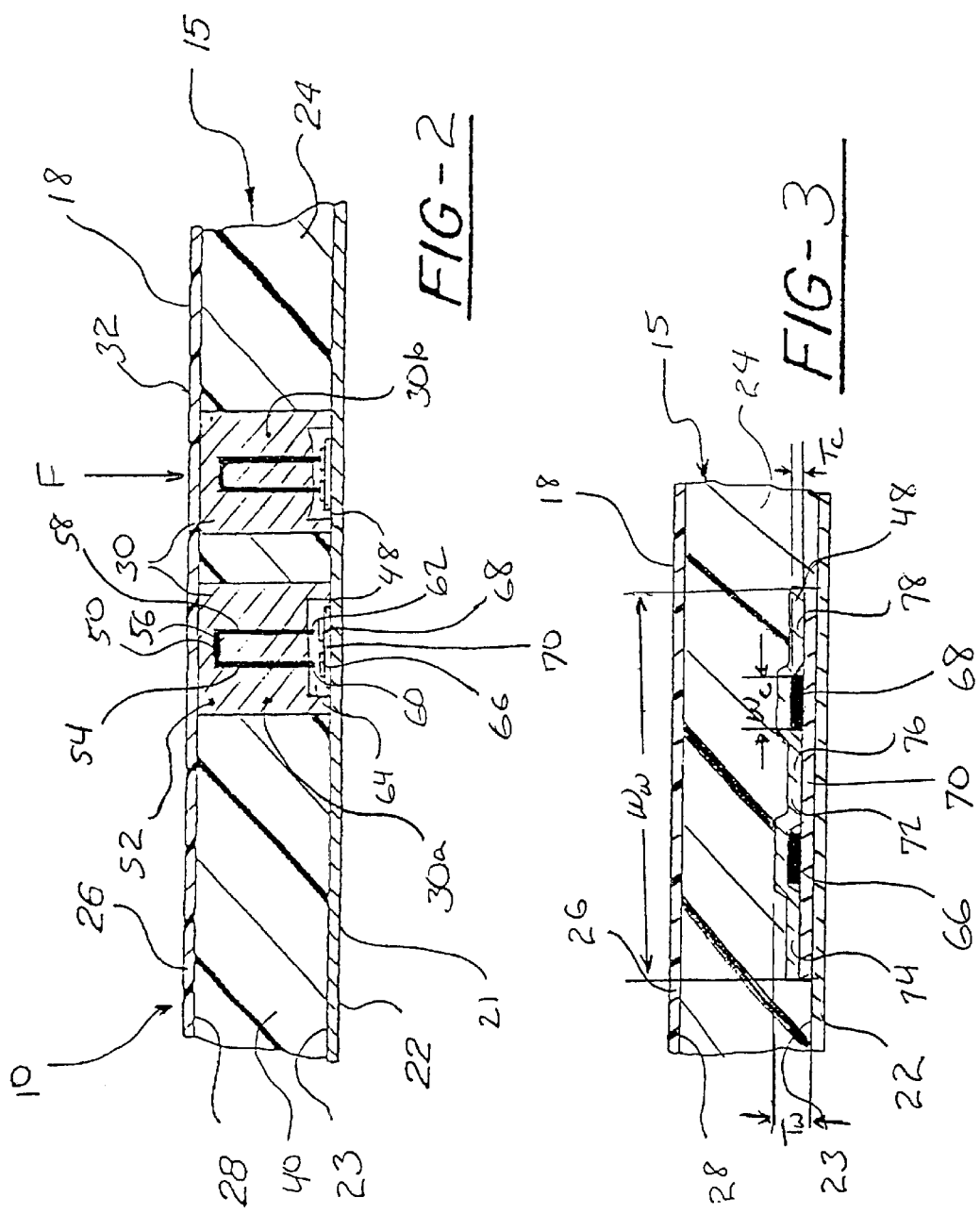

AUTOMOTIVE TRIM PANEL WITH ELECTRICAL WIRING INCORPORATED THEREIN

TECHNICAL FIELD OF THE INVENTION

This invention relates generally to trim panels with electrical wiring incorporated therein and, more particularly, to trim panels which make use of flat wiring.

BACKGROUND OF THE INVENTION

U.S. Pat. No. 4,904,429 recites a method of producing an instrument panel of a motor vehicle or similar molding of foamed resin capable of fitting electrical parts thereon as desired. More particularly, the '429 Patent recites a method of producing a molding of foamed resin in which a flexible printed circuit (FPC), which is electrically connectable to electrical parts, is buried.

The '429 Patent also recites that an instrument panel has customarily been implemented as a laminate having three layers, i.e., a covering made of soft resin, a base made of ABS resin or similar hard resin, and a padding made of foamed urethane or similar foaming resin and sandwiched between the covering and the base, and that an FPC and couplers are each mounted on the base by using adhesive or screws. Continuing, the '429 Patent recites that such a prior art three-layer instrument panel, however, is not satisfactory because the base and the padding have to be produced independently of each other and then bonded together, resulting in a disproportionate production cost.

As an alternative to the prior art three-layer instrument panel described by the '429 Patent, the '429 Patent recites that the base may be formed from a foamed resin and molded integrally with the padding. However, when the base is formed from a foamed resin, the '429 Patent then discloses that the FPC and couplers may not be mounted with screws or adhesives. Consequently, the '429 Patent proposes a solution for mounting the FPC and couplers to this alternative structure by burying the FPC and couplers in the base when the latter is molded.

In light of the '429 Patent, what is needed is a structure and method of combining a flat wire with a three-layer interior trim panel without the need for separate fasteners, such as screws, or adhesives.

SUMMARY OF THE INVENTION

Accordingly, the present invention provides a structure and a method for combining a flat wire with a three-layer instrument panel without the need for separate fasteners, such as screws, or adhesives.

According to one feature of the invention, a vehicle interior trim panel is provided comprising a skin, a substrate, a foam located between the skin and the substrate, and a flat wire at least partially surrounded by and embedded in the foam.

According to another feature of the invention the flat wire comprises a flexible printed circuit.

According to another feature of the invention, a terminal end of the flat wire may include a connector.

According to another feature of the invention, the foam comprises a density between 0.016 g/cm$^3$ to 0.288 g/cm$^3$.

According to another feature of the invention, the foam comprises an ultimate elongation greater than five percent.

According to another feature of the invention, the substrate comprises a substrate aperture and the flat wire passes though the aperture.

According to another feature of the invention, the substrate comprises at least a portion of a flat wire holder.

According to another feature of the invention, the substrate portion of the flat wire holder is formed with the substrate and is adjacent the inner substrate surface.

According to another feature of the invention, the flat wire holder at least partially confines movement of the flat wire.

According to another feature of the invention, the flat wire holder comprises an elongated recess for holding or confining a terminal end of the flat wire with a smaller width dimension or a smaller length dimension than the terminal end of the flat wire.

According to another feature of the invention, the flat wire holder comprises a pocket for holding or confining at least a portion of the flat wire, and at least a portion of the pocket comprises a recess formed in the substrate.

According to another feature of the invention, the foam at least partially enters into the substrate aperture and the foam surrounds at least a portion of the flat wire.

According to another feature of the invention, the foam entering into the substrate aperture is a buffer between the flat wire and a surface of the substrate aperture.

According to another feature of the invention, the foam entering into the substrate aperture reduces contact, noise and wear between the flat wire and a surface of the substrate aperture.

According to another feature of the invention, the foam exiting from the substrate aperture surrounds at least a portion of the flat wire, prevents the flat wire from being displaced from an embedded position and reduces contact between the flat wire and a corner of the substrate aperture.

According to another feature of the invention, the terminal end of the flat wire is moved from a first position to a second position.

According to another feature of the invention, a method of making a vehicle interior trim panel comprises providing a substrate, providing a skin, routing a flat wire along a surface of the substrate and through a substrate aperture, and providing a foam between the skin and the substrate such that the foam at least partially surrounds and embeds a portion of the flat wire.

According to another feature of the invention, the method of making a vehicle interior trim panel further comprises the foam entering at least a portion of the substrate aperture between the flat wire and at least one substrate aperture surface.

According to another feature of the invention, the method of making a vehicle interior trim panel further comprises the foam exiting the substrate aperture between the flat wire and at least one substrate aperture surface.

According to another feature of the invention, the method of making a vehicle interior trim panel further comprises at least partially confining the flat wire in a pocket and adjacent the substrate inner surface.

According to another feature of the invention, the method of making a vehicle interior trim panel further comprises at least partially confining the terminal end of the flat wire in an elongated recess and adjacent the substrate inner surface.

According to another feature of the invention, a method of marking a skin for a vehicle interior trim panel comprises providing a skin with a color and an outer skin surface, and applying a laser to the outer skin surface such that a portion of the skin surface contacted by the laser changes color relative to a portion of the outer skin surface not contacted by the laser to create a marking in the outer skin surface indicating the presence of a vehicle component or function.

BRIEF DESCRIPTION OF THE DRAWINGS

To better understand and appreciate the invention, refer to the following detailed description in connection with the accompanying drawings:

FIG. 1 is a perspective view of an interior trim panel electrical switch assembly according to the present invention;

FIG. 2 is a cross sectional view of the switch of the interior trim panel electrical switch assembly of FIG. 1 taken along section line 2—2;

FIG. 3 is a cross sectional view of the wire of the interior trim panel electrical switch assembly of FIG. 1 taken along section line 3—3;

DETAILED DESCRIPTION OF THE INVENTION

Figure 4:
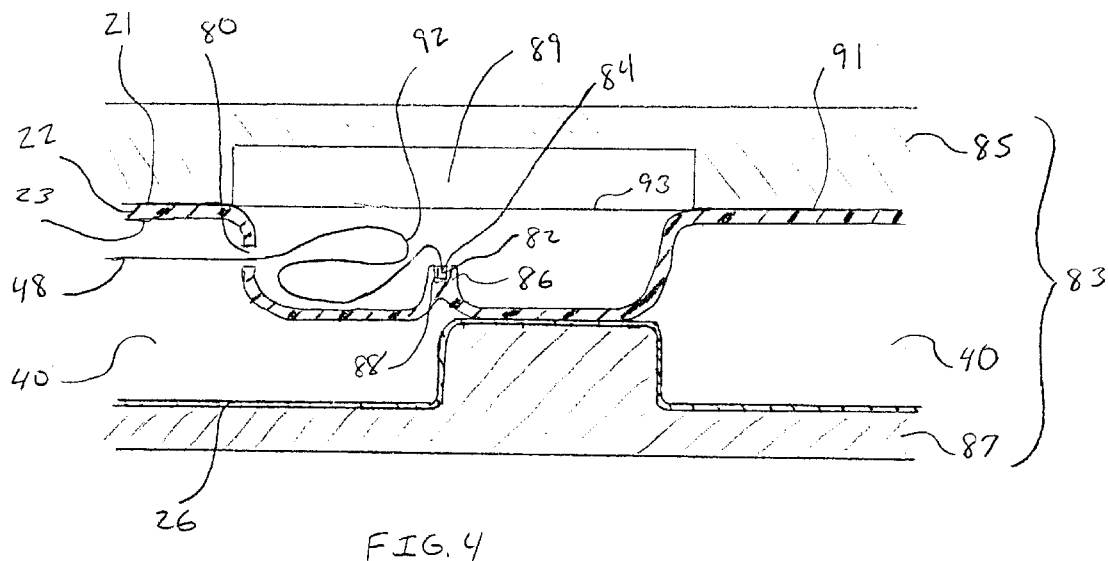
FIG. 4 is a cross sectional view of the trim panel of FIG. 1 in a foam mold prior to introducing foam material taken along section line 4—4 according to a second embodiment of the present invention.

An exemplary vehicle interior trim panel electrical switch assembly of the type for actuating various vehicle electrical devices is shown at 10 in FIG. 1 in connection with an armrest 12 for a vehicle trim panel 14, such as a door panel. As shown in FIGS. 1 and 2, the armrest 12 is formed as a soft feel composite 15 which includes a switch panel portion 16 that has an outer surface 18 covering a switch array 20 including three electrical switches indicated at 20a–20c. Two of the three electrical switches may be for locking and unlocking the doors of the vehicle while the remaining switch may be a multiposition switch for adjusting the position of the side view mirror. Other switches not shown may include, but are not limited to, switches for opening and closing windows, seat adjustment and for selecting either the left or the right side view mirror for adjustment.

The armrest 12 is shown as a separate member from the trim panel 14, but the armrest and trim panel 14 could be formed as one integral interior trim panel. Furthermore, the vehicle interior trim panel electrical switch assembly 10 can be employed on any interior surface of any trim panel in the vehicle. For example, it can be part of the instrument panel, headliner, overhead console, seats or any other part of a vehicle interior.

Additionally, the switch array 20 can vary in number and location. For example, in another application a single switch can be provided to operate an overhead light, a power operated sunroof or other electrically switched accessory on a motor vehicle. Other arrangements will depend upon the system being controlled by the switch array 20 underlying the switch panel portion 16.

As shown in FIG. 2, the soft feel composite 15 and switch panel portion 16 of the interior trim panel electrical switch assembly 10 comprises a substrate layer 22, a foam layer 24, and a skin layer 26. The outer surface 18 of skin layer 26 is the surface generally viewed by a vehicle occupant and is preferably continuous between the soft feel composite 15 and switch panel portion 16 of trim panel 14. Generally, foam layer 24 is bonded directly to outer surface 23 of substrate layer 22 and to inner surface 28 of skin layer 26.

A switch 30 and a wire 48 are located beneath outer surface 18 within the switch panel portion 16 of the interior trim panel electrical switch assembly 10. Preferably, the switch 30 has a low profile which allows it to be easily incorporated under outer surface 18 of skin layer 26 of the switch panel portion 16. As used in this specification, a low profile switch has a thickness less than or equal to that of foam layer 24. In other words, a thickness less than or equal to the distance as measured between the inner surface 28 of skin layer 26 and outer surface 23 of substrate layer 22. More preferably, the switch 30 provides a substantially flat or arcuate surface region 32 in outer surface 18 of skin layer 26 without any bumps, ridges or other disruptions in outer surface 18. However, it is recognized that certain disruptions in the outer surface 18 may be desirable as to provide assistance in locating switch panel portion 16 in an environment of reduced light or when it is unsafe for the driver to remove his vision from the road for the purposes of locating switch panel 16.

Switch 30 preferably comprises a switch arm 50 disposed within a housing portion 52. Switch arm 50 functions as a conductor and preferably comprises a metal such as copper. In the illustrated exemplary embodiment, switch arm 50 is preferably U-shaped and comprises elongated member 54 connected to elongated member 58 by connecting member 56. Preferably connecting member 56 is completely embedded in housing 52 which functions as an insulator while elongated member 54 and elongated member 58 are only partially embedded within housing portion 52 with contact portions 60 and 62 respectively thereof remaining exposed. Preferably, housing portion 52 comprises a polymer material and more preferably the polymer material comprises a silicone polymer.

Preferably, housing 52 also comprises a recessed cavity 64 into which contact portions 60 and 62 of elongated members 54 and 58 project into. Recessed cavity 64 also preferably contains a wire 48. Wire 48 comprises conductors 66 and 68 as well as an insulator 70 upon which conductors 66 and 68 are located. Outside the confines of recessed cavity 64, wire 48 also includes an insulator 72 as shown in FIG. 3.

Apart from operation, switch 30 exists more particularly as switch 30a in which the associated electrical circuit is in a normally open state. Then, during operation, switch 30 exists more particularly as switch 30b in which the associated electrical circuit is in a closed state. More specifically, during operation a force F is applied to outer surface 18 of skin layer 26. Force F is ordinary applied by the vehicle occupant through the fingertips. Upon application, force F works on skin layer 26 and housing 52 such that they deform to enable contact portions 60 and 62 of elongated members 54 and 58 of switch arm 50 to contact conductors 66 and 68 of wire 48 and thus close the electrical circuit as created through connecting member 56 of switch arm 50.

As indicated above, within the confines of recessed cavity 64, wire 48 comprises conductors 66 and 68 as well as an insulator 70 upon which conductors 66 and 68 are located. However, as also indicated above, outside the confines of recessed cavity 64, wire 48 also includes an insulator 72 as shown in FIG. 3. It is noted that insulator 72 exists outside the confines to recessed cavity 64 generally to protect conductors 66 and 68 from undesirable short circuits outside the confines of recessed cavity 64. More specifically, conductors 66 and 68 of wire 48 are protected from short circuit by virtue of being encapsulated between insulators 70 and 72.

As can best be seen from FIG. 3, conductors 66 and 68 preferably have a thin cross sectional thickness with a width Wc greater than thickness Tc. More particularly, conductors 66 and 68 comprise an electrically conductive metal, such as copper or similar metal, in the form of a thin foil. Insulators 70 and 72 comprise thin films, preferably polymer films and more preferably urethane polymer films which are laminated about their edges 74 and 78 as well as a central portion 76 located between conductors 66 and 68. The use of one or more conductors with a rectangular shape sandwiched between two polymer films may be referred to as "flat" wire. The use of flat wire, as opposed to traditional round wire with a round conductor, is preferred for at least partially surrounding and embedding wire 48 in the foam layer 24 by virtue if its thinner cross-sectional thickness than traditional round wire.

More particularly, the flat wire 48 may take the form of a flexible printed circuit (FPC). A FPC generally consists of a pair of polymer or resin films with one or more copper, or similar metal, foils sandwiched therebetween. Upon operation, the metal foil generally functions as an electrical circuit routing electric current between one or more connected electrical devices.

In addition to switch 30 and wire 48 being located beneath the outer surface 18 of the switch panel portion 16 of the interior trim panel electrical switch assembly 10, preferably they are at least partially surrounded by and embedded in the foam layer 24 of the soft feel composite 15.

Preferably, prior to being at least partially surrounded and embedded by the foam layer 24, switch 30 is joined to the inner surface 28 of skin layer 26 or to the outer surface 23 of substrate layer 22, but it is recognized that switch 30 may be positioned at any location therebetween. More preferably, switch 30 is joined to the inner surface 28 of skin layer 26 and/or to the outer surface 23 of substrate layer 22, by a double-sided pressure sensitive adhesive tape located therebetween.

As with switch 30, prior to being at least partially surrounded and embedded by the foam layer 24, wire 48 may also be joined to the inner surface 28 of skin layer 26 or to the outer surface 23 of substrate layer 22, but it is recognized that wire 48 may be positioned at any location therebetween. More preferably, wire 48 is joined to the outer surface 23 of substrate layer 22 by a double-sided pressure sensitive adhesive tape located therebetween or mechanical type engagement clips.

In order to at least partially surround and embed the switch 30 and/or wire 48 in foam layer 24, the switch 30 and/or wire 48 are preferably placed in the cavity 40 created between the inner surface 28 of skin layer 26 and the outer surface 23 of substrate layer 22 as shown in FIG. 2 prior to the introduction of the foam layer 24. Then, foam layer 24 is preferably formed by introducing a foam, or more preferably, a foam precursor material into cavity 40. Preferably, the foam precursor is a urethane foam precursor which is introduced using a reaction injection molding process as known in the art. After the urethane foam precursor is introduced, the reactive constituents, a polyol and isocyanate, begin to react and the subsequently created foam material flows within the cavity 40 thus bonding skin layer 26 to substrate layer 22 while at the same time and flowing around and preferably bonding to the exposed surfaces of switch 30 and wire 48.

Alternatively, switch 30 and/or wire 48 may be located in the skin layer 26. For example, the switch 30 may be held in place as skin-casting material is cast around it as more particularly shown in U.S. Pat. No. 5,269,559 assigned to the assignee of the present invention and incorporated herein by reference.

In the embodiment shown in FIGS. 1, 2 and 3, many types of adhesives, including urethanes, etc., may be used to bond the switch 30 or wire 48 to skin layer 26 or substrate 26 of trim panel 14. The adhesives may be applied in any one of a number of forms to include pressure-sensitive backings, hot melts and spray coatings.

While skin layer 26 is preferably formed by casting, skin layer 26 may also be formed by spray coating, blow molding, or thermoformed sheet and then incorporated into the subsequent foam forming process identified above. With regards to more specific skin materials, skin layer 26 may comprise thermoset or thermoplastic polymers. This group includes, but is not limited to, polymers containing vinyl (e.g. polyvinyl chloride (PVC)), urethane (e.g. thermoplastic urethane (TPU)), olefin (e.g. poylpropylene (PP), polyethyelene (PE), thermoplastic olefins (TPO)), and styrene (e.g. acrylonitrile-butadiene-styrene (ABS)). Also while foam layer 24 is preferably joined to skin layer 26 and substrate layer 22 simultaneously by the reaction injection molding process, foam layer 24 may also be joined to skin layer 26 prior to introduction of substrate layer 22 rather than simultaneously as identified above. For example, skin layer 26 and foam layer 24 may be provided as a multi-layer sheet which is subsequently heated and vacuum formed over substrate layer 22.

In the various embodiments, the foam layer preferably has certain molding conditions and physical properties. With regards to molding conditions, the foam layer 24 is preferably molded below 25 PSI (pounds per square inch) molding pressure and more preferably below 15 PSI molding pressure and even more preferably below 10 PSI molding pressure as to reduce any deformation of the FPC during the foam molding process. With regards to measuring the molding pressure, it is noted that molding pressure may be measured at any location within the trim panel 14. With regards to physical properties, the foam layer 24 preferably exhibits the following:

| Property | Test Method | Value |
| --- | --- | --- |
| Density | ASTM-3574-95 | 0.016–0.288 g/cm$^3$ |
| Ultimate Elongation | ASTM-3574-95 | Greater than 10% |

With regards to measuring density, while any suitable test method may be used, the preferred test method is that of ASTM-3574-95, Test A—Density Test. With regards to range of density values, while the preferred value identified above is from 0.016 to 0.288 g/cm$^3$, more preferably the value is from 0.06 to 0.15 g/cm$^3$. With regards to the measured value, it is noted that the above values correspond to that of any single specimen (taken from any location within the trim panel 14), either an interior density specimen or a section density specimen as defined in ASTM-3574-95, and not the calculated median of more than one measured specimen. This is in accordance with ASTM-3574-95, paragraph 11.1 which calls for a single specimen to be tested.

With regards to measuring ultimate elongation, while any suitable test method may be used, the preferred test method is that of ASTM-3574-95, Test E—Tension Test. With regards to the range of elongation values, the preferred value identified above is greater than or equal to five percent (5%), more preferably the value is greater than or equal to ten percent (10%), and even more preferably the value is greater than or equal to twenty-five percent (25%) ultimate elongation. With regards to the measured value, it is noted that the above values correspond to that of any single specimen (taken from any location within the trim panel 14), as defined in ASTM-3574-95, and not the calculated median of more than one measured specimen. This is in deviation with ASTM D-3574-95, paragraph 48.1 which calls for three specimens to be tested and the median value to be reported.

Indicia 41 in the form of letters, numbers, or symbols may be printed, such as with silk screening, or molded on outer surface 18 of the skin layer 26 to indicate to vehicle occupants the position and/or function of each switch 30 or switch array 20 as shown in FIGS. 1 and 2. As an alternative to or used in combination with printing and/or molding, a laser, and more preferably a YAG laser, may be used to change the color (e.g. bleach or whiten) of the material, and preferably the pigments, of skin layer 26 as to create markings in the outer surface 18 which indicate to vehicle occupants the position and/or function of each switch 30 or switch array 20 as shown in FIGS. 1 and 2.

A transparent protective coating may be applied to the outer surface 18 of the skin layer 26 and to the indicia 41. The coating is preferably applied as a liquid and is then dried to form a thin durable protective film that keeps the indicia from rubbing off as is described in greater detail in U.S. Pat. No. 5,448,028 assigned to the assignee of the present invention and incorporated herein by reference.

Figure 5:
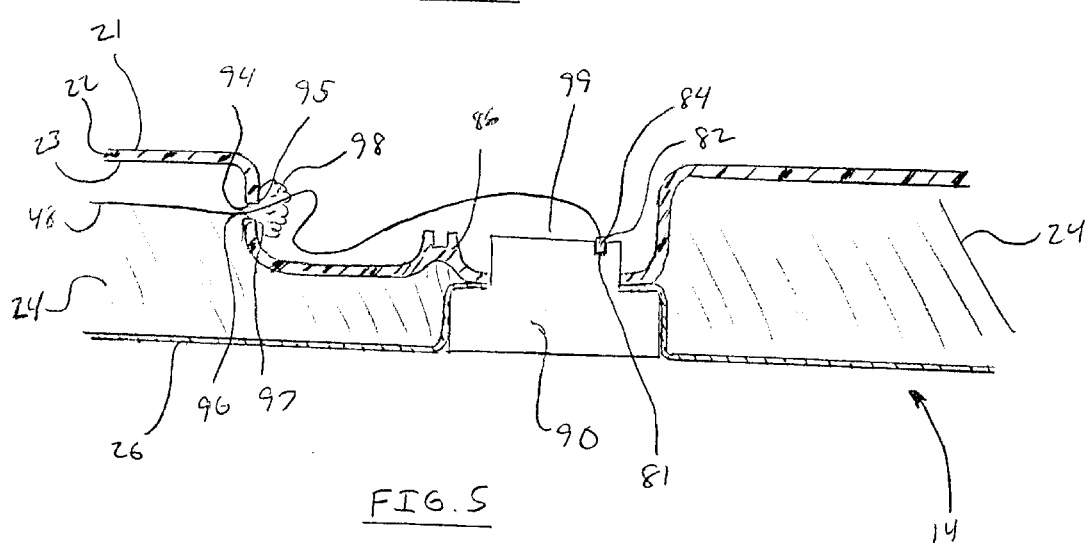
FIG. 5 is a cross sectional view of the trim panel and electrical device of FIG. 1 taken along section line 4—4 according to the second embodiment of the present invention.

In a second embodiment of the invention, as illustrated in FIGS. 4 and 5, a structure is provided to enable wire 48 to enter and exit the confines of foam layer 24 of trim panel 14. More specifically, prior to being at least partially surrounded and embedded by foam layer 24, wire 48 is routed along outer surface 23 of substrate layer 22 and through aperture 80 to the inner surface 21 of substrate layer 22. Upon placing and introducing skin layer 26 to the substrate layer 22 in a foam mold 83 (shown as first mold part 85 and second mold part 87) in a manner well known in the art, wire 48 now exists in cavity 40 and exits cavity 40 at aperture 80. Aperture 80 is of such a geometry as to permit wire 48 to pass there through. Preferably, aperture 80 is of the geometry of an elongated slot of slightly larger dimension, in both width and thickness, than corresponding width Ww and thickness Tw of wire 48.

Upon passing through aperture 80, terminal end 84 of wire 48 may included a connecter 82 attached thereto. Alternatively, connecter 82 may be attached to the terminal end 84 of wire 48 prior to wire 48 passing through aperture 80, in which case the geometry of aperture 80 must be such as to permit connector 82 as well as wire 48 to pass there through.

Terminal end 84 of wire 48, with or without connector 82, may then be placed into a holder 86 which holds, covers and/or protects from damage the wire 48 or terminal end 84 prior to its designated use. While holder 86 is preferably of temporary use, it is recognized that it may be used for permanent use as in the case where the electrical device 90 to which terminal end 84 of wire 48 is to attach is never installed, possibly due to differences in optional equipment between vehicles.

Preferably holder 86 is formed integral with substrate 22 and is of a geometry, preferably that of an elongated recess 88, of slightly smaller dimension, in either, or both, width and thickness, than terminal end 84 of wire 48. In such a manner, terminal end 84 of wire 14 preferably interference fits with recess 88 of holder 86. As a result, terminal end 84 of wire 48 is retained in recess 88 of holder 86 prior to designated use. In other embodiments, holder 86 may be any device which holds terminal end 84 and/or wire 48 in a confined, and preferably fixed, position prior to designated use. Example of such holders include, but are not limited to tape, adhesives, separate mechanical fasteners (e.g. screws, clips, etc.), or other structures designed integral with substrate 22 (e.g. rib structures, doghouses, etc.).

With the introduction of substrate 22 to first mold part 85 of foam mold 83, a pocket 89 must exist between the inner surface 21 of substrate 22 and the mold surface 91 of first mold part 85 for wire 48 and/or terminal end 84 to exist therein. The pocket 89 may be of any suitable geometry to contain wire 48 and/or terminal end 84 without their damage during the foaming process. As shown, pocket 89 comprises a recess in substrate 22 which includes a location for wire 48, terminal end 84 and electrical device 90. Pocket 89 also is shown to comprise a recess in first mold part 85. It is recognized that any number of geometries may be employed to facilitate the presence of wire 48 and/or terminal end 84 adjacent the inner surface 21 of substrate 22 during the foaming process.

The length of wire 48 required to extend wire 48 between aperture 80 and holder 86 may be different than is required to extend wire 48 between aperture 80 and receptacle 81 of electrical device 90. In the case where the length of wire 48 required to extend between aperture 80 and holder 86 is less than the length of wire 48 required to extend wire 48 between aperture 80 and receptacle 81 of electrical device 90, wire 48 may be comprise one or more rolls, bends, or folds 92 which exist while terminal end 84 of wire 48 is retained in holder 86. These rolls, bends, or folds may then be reduced in size or number when terminal end 84 of wire 48 is attached to receptacle 81 of electrical device 90. As used herein, an electrical device 90 is any electrical device, active or passive, electrical or electromechanical, which consumes, generates, or otherwise manipulates electrical power. This includes, but is not limited to, electrical motors, electro-mechanical motors, circuit boards, switches, power sources, couplers, sensors, junction boxes and fuse panels. As shown in FIG. 1, electrical device 90 is a seat switch.

A second example of a holder 86 which holds terminal end 84 and wire 48 in a confined position prior to use is tape 93. Tape 93 may cover the recess in substrate 22 such that, should the terminal end 84 become dislodged from recess 88 of holder 86 or folded wire 48 attempt to unfold from pocket 89 prior to use, the terminal end 84 and/or wire 48 will be prevented from exiting the confines of the recess in the substrate 22.

During the foam process in which foam material flows within cavity 40 thus bonding skin layer 26 to substrate layer 22, preferably foam layer 24 extends into the confines of aperture 80 and exists between surfaces 94 and 96 of substrate 22 with wire 48 located therebetween. In this manner, foam layer 24 acts as a buffer between wire 48 and surfaces 94 and 96 of substrate 22 as to reduce, and preferably prevent, wire 48 from making contact with surfaces 94 and 96 of substrate 22. As a result, the possibility of undesirable noise created by wire 48 rubbing against either surface 94 or 96 of substrate 22 during vehicle movement is substantially reduced. Further, the possibility of an undesirable short circuit caused by insulators 70 or 72 of wire 48 rubbing against either surface 94 or 96 of substrate 22 and wearing to expose the conductors located therebetween is also reduced.

In order to reduce the amount of foam material exiting from aperture 80 as a result of the foam process, a layer of tape or other type of seal (not shown) may be applied to inner surface 21 of substrate 22 to partially close aperture 80. Foam material which exits the aperture may do so in the form of a bun 98. The bun 98 preferably at least partially surrounds and bonds to a portion of the wire 48 which has exited aperture 80. In this manner, the foam bun 96 may act as a stay to help prevent wire 48 which has been at least partially surrounded and embedded by foam layer 24 from being inadvertently displaced from its embedded position by virtue of being partially or completely pulled out through aperture 80, thus damaging the trim panel 14. The bun 96 may also reduce, and preferably prevent, wire 48 from making contact with corners 95 and 97 of substrate 22 which may act to cut or otherwise damage the wire 48 depending on their sharpness.

While bun 98 may be used for the above benefits, depending on the size of the bun 98, it may be partially or completely removed from trim panel 14 after the foaming process. If aperture 80 is to large, the size of the resulting bun 98 may surround and embed a substantial portion of wire 48 such that at least a portion of the bun 98 must be removed. That portion of the bun 98 removed is generally preformed prior to attachment of wire 48 to receptacle 81 of electrical device 90 and often is preformed to facilitate extending wire 48 in order to attach wire 48 to receptacle 81 of electrical device 90. Since the foam material is of a low density and generally flexible or semi-rigid by virtue of its cushion or padding effect, it ordinarily may be removed manually, with and/or without the use of hand operated tools. However, where removal of the bun 98 to the wire 48 or the inner surface 21 of substrate 22 is to be made easier, a mold release may be applied, generally by brush or spray, to wire 48 and inner surface 21 of substrate 22 after wire 48 has passed through aperture 80 and prior to the foaming process.

After removal from the foam mold 83, opening 99 is formed in trim panel 14 to facilitate that attachment of electrical device 90 to trim panel 14. Preferably after electrical device 90 is attached to trim panel 14, but possibly before, terminal end 84 of wire 48 is removed from its confined position (i.e. first position) and attached to receptacle 81 of electrical device 90 (i.e. second position).

We intend the above description to illustrate embodiments of the present invention by using descriptive rather than limiting words. Obviously, there are many ways that one might modify these embodiments while remaining within the scope of the claims. In other words, there are many other ways that one may practice the present invention without exceeding the scope of the claims herein.

What is claimed:

1. A vehicle interior trim panel comprising:
   a skin comprising an outer skin surface and an inner skin surface;
   a substrate comprising an outer substrate surface and an inner substrate surface;
   a foam located between said inner skin surface and said outer substrate surface;
   a flat wire located between said inner skin surface and said outer substrate surface such that at least a portion of said flat wire is at least partially surrounded by and embedded in said foam layer;
   said substrate further comprising a substrate aperture and said flat wire passes though said substrate aperture.

2. The vehicle interior trim panel of claim 1 wherein the flat wire comprises a flexible printed circuit.

3. The vehicle interior trim panel of claim 1 wherein a terminal end of said flat wire comprises a connector.

4. The vehicle interior trim panel of claim 1 wherein the foam comprises a density between 0.016 g/cm$^3$ to 0.288 g/cm$^3$.

5. The vehicle interior trim panel of claim 1 wherein the foam comprises an ultimate elongation greater than five percent.

6. The vehicle interior trim panel of claim 1 wherein the foam comprises an ultimate elongation greater than ten percent.

7. The vehicle interior trim panel of claim 1 wherein the foam comprises an ultimate elongation greater than twenty-five percent.

8. The vehicle interior trim panel of claim 1 wherein the substrate comprises at least a portion of a flat wire holder.

9. The vehicle interior trim panel of claim 8 wherein said substrate portion of said flat wire holder is formed with said substrate.

10. The vehicle interior trim panel of claim 8 wherein said substrate portion of said flat wire holder is adjacent said inner substrate surface.

11. The vehicle interior trim panel of claim 8 wherein the flat wire holder at least partially confines movement of a terminal end of said flat wire.

12. The vehicle interior trim panel of claim 8 wherein the flat wire holder at least partially confines movement of said flat wire.

13. The vehicle interior trim panel of claim 8 wherein the flat wire holder comprises an elongated recess for holding or confining a terminal end of said flat wire.

14. The vehicle interior trim panel of claim 13 wherein the elongated recess comprises a smaller width dimension or a smaller length dimension than said terminal end of said flat wire.

15. The vehicle interior trim panel of claim 8 wherein the flat wire holder comprises a pocket for holding or confining at least a portion of said flat wire.

16. The vehicle interior trim panel of claim 15 wherein the at least a portion of said pocket comprises a recess formed in said substrate.

17. The vehicle interior trim panel of claim 1 wherein said foam at least partially enters into said substrate aperture and said foam surrounds at least a portion of said flat wire.

18. The vehicle interior trim panel entering into said substrate aperture of claim 17 wherein said foam is a buffer between said flat wire and a surface of said substrate aperture.

19. The vehicle interior trim panel entering into said substrate aperture of claim 17 wherein said foam reduces contact between said flat wire and a surface of said substrate aperture.

20. The vehicle interior trim panel entering into said substrate aperture of claim 17 wherein said foam reduces noise created by said flat wire rubbing against a surface of said substrate aperture.

21. The vehicle interior trim panel entering into said substrate aperture of claim 17 wherein said foam reduces wear of said flat wire created by said flat wire rubbing against a surface of said substrate aperture.

22. The vehicle interior trim panel of claim 1 wherein said foam exits from the said substrate aperture and said foam exiting from said substrate aperture surrounds at least a portion of said flat wire.

23. The vehicle interior trim panel of claim 1 wherein said foam exits from the said substrate aperture and said foam exiting from said substrate aperture prevents said flat wire from being displaced from an embedded position.

24. The vehicle interior trim panel of claim 1 wherein said foam exits from the said substrate aperture and said foam exiting from said substrate aperture reduces contact between said flat wire and a corner of said substrate aperture.

25. The vehicle interior trim panel of claim 1 wherein said foam exits from the said substrate aperture and said foam exiting from said substrate aperture is at least partially removed from said trim panel.

26. The vehicle interior trim panel of claim 1 wherein a terminal end of said flat wire is moved from a first position to a second position.

27. A method of making a vehicle interior trim panel comprising:

provide a substrate comprising an outer substrate surface, an inner substrate surface and a substrate aperture;

providing a skin comprising an outer skin surface and an inner skin surface;

routing a flat wire between said outer substrate surface, said inner substrate surface and said substrate aperture;

providing a foam between said inner skin surface and said outer substrate surface such that said foam at least partially surrounds and embeds said flat wire along said outer substrate surface.

28. The method of claim 27 including the step of:

said foam entering at least a portion of said substrate aperture between said flat wire and at least one substrate aperture surface.

29. The method of claim 27 including the step of:

said foam exiting said substrate aperture between said flat wire and at least one substrate aperture surface.

30. The method of claim 27 including the step of:

at least partially confining said flat wire adjacent said substrate inner surface.

31. The method of claim 30 including the step of:

at least partially confining said flat wire in a pocket adjacent said substrate inner surface.

32. The method of claim 27 including the step of:

at least partially confining a terminal end of said flat wire adjacent said substrate inner surface.

33. The method of claim 32 including the step of:

confining said flat wire in an elongated recess adjacent said substrate inner surface.

* * * * *